March 6, 1928. 1,661,327
D. DONCHEFF
AIRCRAFT
Filed Dec. 21, 1925 2 Sheets-Sheet 1
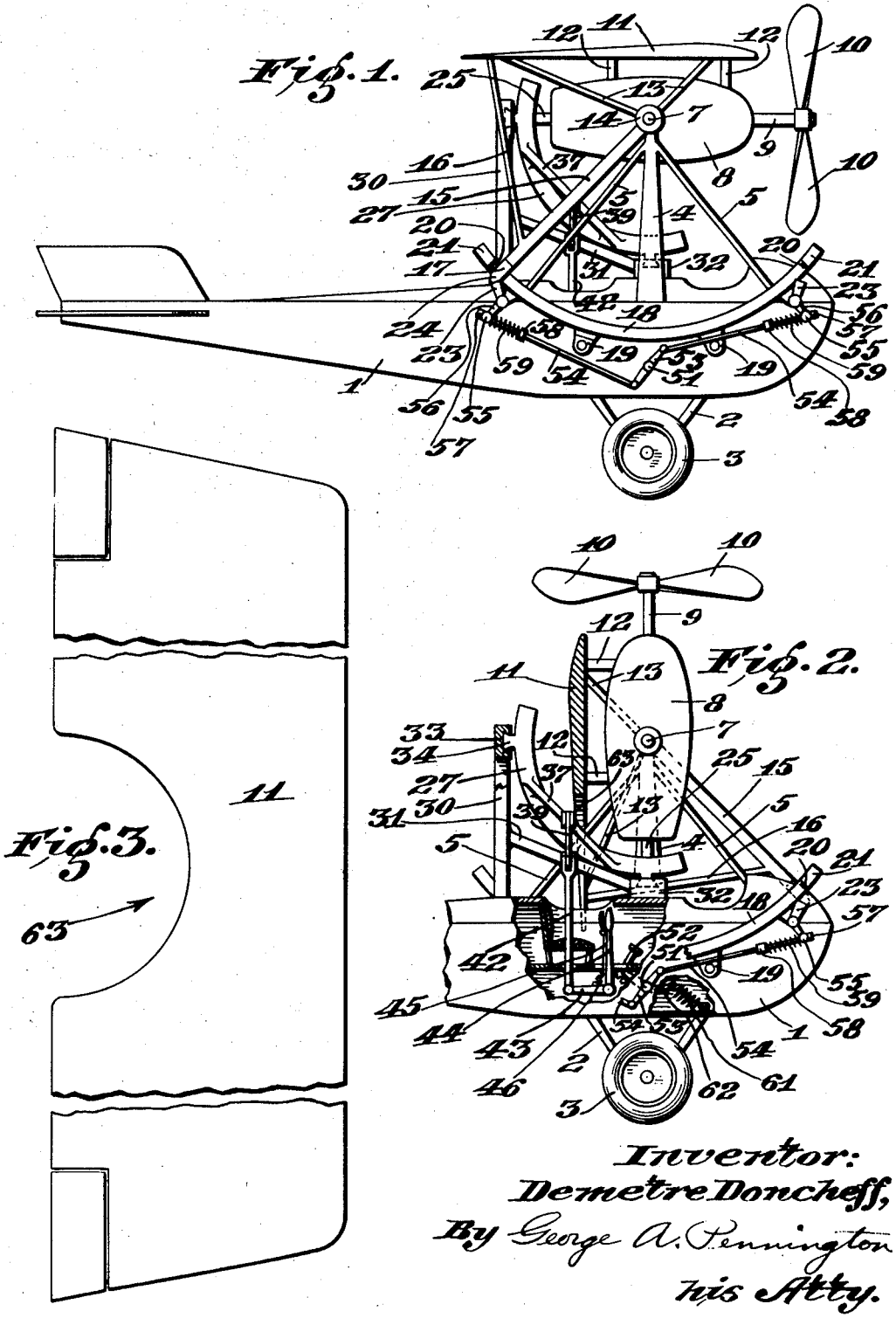

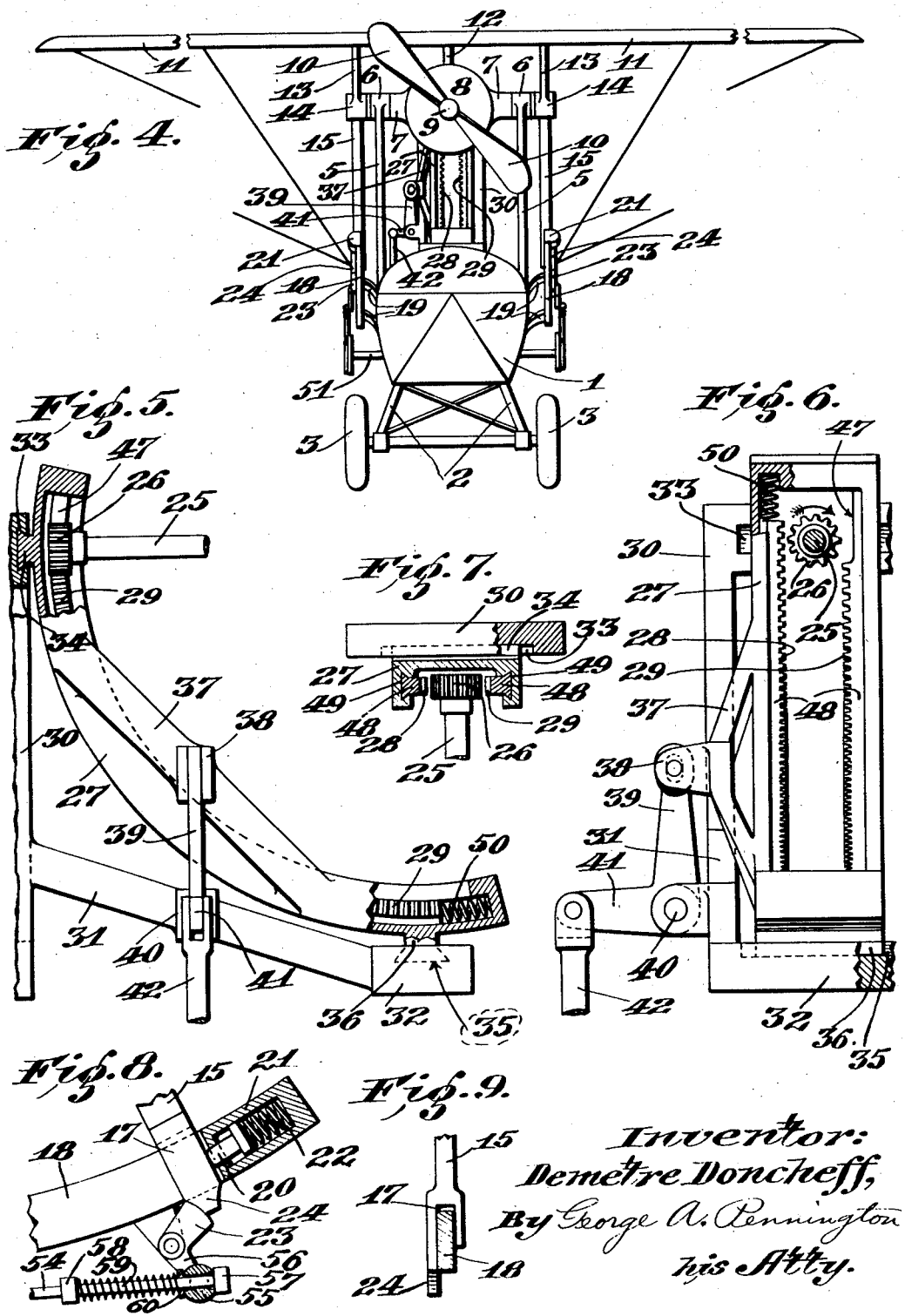

Patented Mar. 6, 1928.

1,661,327

UNITED STATES PATENT OFFICE.

DEMETRE DONCHEFF, OF EAST ST. LOUIS, ILLINOIS.

AIRCRAFT.

Application filed December 21, 1925. Serial No. 76,739.

This invention relates to aircraft and more particularly to heavier than air flying machines of the aeroplane type. It has for its principal objects to provide for the conversion of the machine from the common aeroplane principle of operation to that of the helicopter principle, at the will of the operator, so as to raise it straight up from the ground and to bank it while in flight so as to facilitate landing; to provide for effecting the change in the angle of incidence of the plane wings together with the position of the motor and propeller relative to the fuselage body or carriage of the machine automatically and under the power of the motor so as to secure speedy action and to minimize the manual operations and not unduly add to the regular manipulating devices already under the direct control of and necessarily operated by the operator. Other objects and advantages to be attained will more fully appear in the following description.

The invention consists in the parts and combinations and arrangements of parts hereinafter described and afterwards pointed out with particularity in the appended claims.

In the accompanying drawings forming part of this specification and illustrating a practical adaptation of the invention,—

Figure 1 is a side elevation of a flying machine of the monoplane type, the parts being in normal flight condition;

Figure 2 is a fragmentary side elevation of the forward portion of the machine, the shiftable parts being set for vertical flight as a helicopter;

Figure 3 is a top plan view of the plane wings detached from the machine;

Figure 4 is a front elevation of the machine in the condition shown in Figure 1;

Figure 5 is a detail view, on an enlarged scale, partly in side elevation and partly in section, of the laterally shiftable rack sector and its supporting frame;

Figure 6 is a fragmentary view, in front elevation and partial section, of the parts shown in Figure 5;

Figure 7 is a cross section through the rack sector and showing the normal correlation thereto of the pinion on the motor shaft;

Figure 8 is a fragmentary view, on an enlarged scale, partly in side elevation and partly in section, to show the details of the guiding and latching means for the rocking frames which support the plane wings on each side of the fuselage body or carriage of the machine; and Figure 9 is a cross section of the arcuate guide member and detail of the bifurcated end portion of the rocking frame member which works thereon.

Referring now to the drawings, wherein a flying machine of the monoplane type is shown conventionally and without detail, except as to such part or parts thereof that are directly concerned in the present invention, the numeral 1 designates the fuselage body or carriage of the machine which is mounted on the usual under carriage gear 2, including the ground wheels 3, and is equipped with the usual tail stabilizers, rudder, elevators and control mechanisms therefor.

On opposite sides of the fuselage body 1 are upstanding frame members 4 which are braced by diagonal stays 5, and on the upper ends of which are bearings 6 (see Figure 4) for trunnions 7 of a preferably projectile-shaped casing for housing 8 (see Figures 1 and 2). In this casing or housing 8 are located the motor and its usual correlated adjuncts (not shown, but perfectly obvious), and projecting from the forward end thereof is the propeller shaft 9 on which are the usual blades 10.

The plane member 11 is attached at its middle to the casing 8, as by struts 12, and on opposite sides of said casing the extending wings of the plane are supported by a rocking frame including the members 13 which merge with a hub member 14 fixed on the outer end portions of the trunnions 7 so as to rotate therewith. These frames also include members 15 extending downward from said hub 14 and being connected to the wings of the plane by struts 16.

The lower end portions of the frame members 15 are bifurcated, as at 17 (see Figure 9), so as to straddle arcuate guide bars 18 which are secured on opposite sides of the fuselage body 1, as by outwardly offset brackets 19. At each end of these guide bars 18 are cushioned stop members 20 against which said frame members 15 strike at the termination of the shifting movements of the frames in either direction, as will be later more fully described. These stop members 20 each comprise a shouldered pin or stud (see Figure 8) working in a housing 21 and being normally pressed forward by a spring 22.

Adjacent to each of the stop members 20 are latch members 23 which are located in the paths of the end portions 24 of said frame members 15 which are engaged and releasably held thereby, the engaging ends of said latch members 23 and the co-operating portions of said frame members 15 being correspondingly curved on a radius from the pivotal center of the latch members (see Figure 8.)

On the rearward extension 25 of the motor shaft is fixed a pinion 26 which normally co-operates in neutral position with respect to an arcuate rack member or sector 27 which is provided with two opposed series of rack teeth 28, 29 (see Figure 6), said member 27 being shiftable laterally, in a manner to be presently described, for the purpose of engaging said pinion 26 with either series of said rack teeth 28, 29.

On the fuselage body 1 is a supporting frame comprising the upright member 30 which is connected by a diagonal strut or brace member 31 to a forward base member 32. The member 30 is provided with a horizontal undercut groove 33 in which a counterpart lug 34 on the member 27 slidably fits, while the member 32 is similarly provided with a groove 35 in which a counterpart lug 36 on the member 27 works.

The member 27 is provided with a lateral bracket extension 37 having a bifurcated lug 38 which is engaged with a slot-and-pin connection by the upper arm of a bell-crank lever 39, which latter is pivotally mounted, as at 40, on the diagonal frame member 31. The horizontal arm 41 of the bell-crank is pivotally connected to the upper end of a rod 42 whose lower end is pivotally connected to an arm 43 of a bell-crank operating lever 44, which latter is pivotally mounted in the fuselage body 1 within convenient reach of the operator of the machine (see Figure 2). This lever 44 is provided with the usual clutch member 45 which engages the toothed sector 46 so as to releasably hold said lever in its neutral and operated positions.

By operating the lever 44 the rack sector 27 may be shifted laterally to the right or left, as the case may be, to bring the respective rack teeth 28, 29, into engagement with the pinion 26 on the motor shaft 25. In this connection, assuming that the pinion 26 rotates in the direction of the arrow shown in Figure 6, or, in other words, clockwise, and the rack teeth 28 are in engagement with the pinion 26, said pinion will ride down said teeth 28, thereby tilting the housing 8 and the frames carrying the plane wings 11, under the power of the motor, the tilting action continuing until the pinion rides to the lower end of the rack 28.

Said series of teeth 28 terminate with a cut-away or mutilated portion at the lower end of the sector 27, not shown in the drawings, but in a manner similar to that portion 47 shown at the upper end of the rack teeth 29 (see Figure 6), and as soon as the pinion reaches such mutilated portion of the rack 28 the pinion, of course, is clear of and out of engagement therewith, whereupon the tilting movement ceases and the housing 8, together with the propeller and plane wings, is in vertical position as shown in Figure 2. At this time, the latch members 23 at the forward ends of the arcuate guide members 18 are engaged by the projecting end portions 24 of the frame members 15, said frame members, of course, having been previously released from the rear latch members 23 just before the rack sector 27 was shifted to engage the pinion 26 and rack teeth 28.

Said frame members 15 are cushioned at the termination of their stroke by moving against the projecting spring-pressed members 20. To overcome the sudden engagement of the pinion 26 and rack teeth 28, said teeth are provided on a bar 48 which is provided with a counterpart portion to fit in an undercut groove or slideway 49 in the sector member 27 (see Figure 7), and between the upper end of said bar 48 and an abutment at the adjacent end of the sector member a spring 50 is interposed. By this arrangement, the bar 48 will yield upwardly against the tension of said spring 50 as said pinion engages the teeth 28, thereby tending to cushion and relieve the teeth of the initial shock, and, as the pinion rides down the rack said spring 50 reacts to move the bar 48 downward to its normal position on the sector 27, particularly when said pinion has reached the mutilated portion 47 and has cleared the teeth.

To restore the housing 8 and the plane wings together with the propeller to normal position, as shown in Figure 1, the latch members 23 at the forward ends of the guide members 18 are released from the lower end portions of said frame members 15 and the operating lever 44 is moved to shift the sector 27 in the reverse lateral direction so as to bring the rack teeth 29 into engagement with the pinion 26, whereupon the latter rides up said teeth 29. A spring is provided, of course, at the lower end of the bar 48 of said teeth 29 similarly to the spring 50 just above described in connection with the operation of the bar 48 on which the teeth 28 are provided.

As a means for controlling the respective latch members 23, a transverse shaft 51 is mounted in the lower portion of the fuselage body 1 and provided with a foot lever 52 within convenient reach of the operator.

The ends of this shaft 51 are extended outside of the fuselage body and they have fixed thereon rock arms 53 which are pivotally attached to rods 54 slidably fitted at their outer ends in pivot blocks 55 on the arms 56 of said latch members 23. On the outer ends of said rods 54 are heads 57 which normally abut said pivot blocks 55, and interposed between said pivot blocks and collars 58 fixed on said rods 54 are springs 59 with a loose abutting washer 60 which bears against the pivot block, by which arrangement said latch members 23 are yieldably held in normal position against said heads 57 and snap into engaging relation with the ends 24 of the frame members 15 as the latter pass thereover.

To hold the foot lever 52 in normal position, a spring 61, somewhat stronger than the combined strength of the springs 59, is applied to an extension arm 62 of said foot lever (see Figure 2). By this means the rods 54 are also normally held in extended position so that said springs 59 may function as above described in holding the latch members in normal position.

In the operation of the machine, to start from the ground straight upward as a helicopter, the motor is first started in the usual manner. The operator then presses the foot pedal 52 to effect the release of the rear latch members 23 from the ends of said frame members 15. The operating lever 44 is then manipulated to effect the engagement of the rack teeth 28 with the pinion 26. As soon as the shifting movement of the housing 8, with the plane wings and propeller, has started, the foot lever 52 is relieved of the pressure of the operator's foot, and upon the completion of the shifting movement the frame members 15 are engaged by the forward latch members 23 whereby the parts are locked in position as shown in Figure 2 of the drawings.

After the machine has reached the desired altitude, the operator releases said forward latch members 23 from the ends of the frame members 15, and then shifts the sector 27 to bring the teeth 29 into engagement with the pinion 26, whereupon the parts are restored to normal position, and the machine is then flown in the usual manner as an aeroplane and under the regular control of the operator.

Should it be desired to descend substantially straight downward in making a landing, the operator can readily shift the rack member 27 to bring the teeth 28 into engagement with the pinion 26 to bring the parts to the same relative position as for straight upward ascent, and by properly slowing down the motor and thereby decreasing the speed of the propeller blades the machine can be eased to the ground.

It is to be noted that for the structure shown in the drawings, the plane 11 has its middle rear portion recessed, as at 63 (see Figure 3) so as to clear the trunnion frames and other parts which might interfere with the tilting thereof. However, it is obvious that the plane may be entirely divided at its middle and the separate wing sections mounted separately on each side of the trunnion supporting frames. So, too, it is further obvious that while the invention is shown applied to a monoplane structure, it is equally applicable to a biplane or structure comprising multiple planes. And the invention admits of considerable other modification without departing from the spirit and scope thereof as defined by the appended claims. Therefore, it is not limited to the specific construction and arrangement shown in the accompanying drawings.

What is claimed is:

1. In an aeroplane, a fuselage body, trunnion supports thereon, a motor housing having trunnions pivotally mounted on said supports on an axis transversely of said fuselage body, rocking frames movable with said motor housing, plane wings supported by said rocking frames so as to move in fixed relation to said motor housing, releasable latching means for holding said rocking frames in normal and operated positions, a laterally shiftable rack sector on said fuselage body, a pinion driven from the motor in said housing, said pinion being normally disengaged from said rack sector, and means controlled by the operator for shifting said rack sector to operatively engage the latter with said pinion, at will, whereby to shift said motor housing and said plane wings about said transverse axis on said fuselage body.

2. In an aeroplane, a fuselage body, trunnion supports thereon, a motor housing having trunnions pivotally mounted on said supports on an axis transversely of said fuselage body, said housing having a forwardly projecting propeller shaft with propeller blades thereon, and a rearwardly projecting shaft having a pinion thereon, rocking frames fixed on said trunnions of said motor housing on opposite sides of said fuselage body, arcuate guide members on the sides of said fuselage body with which said rocking frames slidably co-operate, latch members adjacent to the ends of said arcuate guide members for engaging said rocking frames in their normal and operated positions, means under the control of the operator for releasing said latch members from said rocking frames, at will, an arcuate member movably mounted on said fuselage body whereby to be shifted transversely thereof, said laterally shiftable member having opposed toothed racks thereon and between which said pinion on the motor shaft is normally disposed in neutral relation, and means under the control of the operator for shifting said arcuate member to bring either of said toothed racks thereon into engagement with said pinion, at will.

3. In an aeroplane, a motor mounted on an axis transversely of the fuselage of the machine, a sector in co-operative relation to said motor, said sector having spring-resisted endwise movable toothed rack bars thereon in parallel spaced and opposed relation, a pinion driven by said motor and being normally disposed in neutral position between said rack bars on said sector, and means for shifting said sector laterally to bring either of said rack bars into engagement with said pinion, at will, plane wings mounted to swing about a transverse axis on the fuselage of the machine with said motor, rocking frames for supporting said wings on opposite sides of said fuselage, cushioned stop members for arresting the movement of said rocking frames from and on return to normal position, latch members for engaging and holding said rocking frames in normal and operated positions, and means under the control of the operator for releasing said latch members from said rocking frames, at will.

4. In a flying machine of the motor-propelled aeroplane type, said machine comprising a plane and a propeller shiftable about a transverse axis of the machine, and motor-driven means for simultaneously changing the angle of incidence of said plane and corresponding position of the propeller, said means including a pair of opposed rack-bars in spaced parallel longitudinal relation, means for shifting said rack-bars laterally, and a pinion operating rotatively in one direction only under the power of the motor and being operably connected with said plane and propeller whereby to effect the tilting movement thereof about their respective axes, said pinion being normally in neutral relation between said two rack-bars and being engageable by either of them at will.

5. In a flying machine of the motor-propelled aeroplane type, said machine comprising a plane and a propeller shiftable about a transverse axis of the machine, and motor-driven means for simultaneously changing the angle of incidence of said plane and corresponding position of the propeller, said means including a pinion operating rotatively in one direction only under the power of the motor and being operably connected with said plane and propeller whereby to effect the tilting movement thereof about their axis, a pair of opposed rack-bars in spaced parallel longitudinal relation on opposite sides of said pinion, and means for effecting a relative lateral movement between said rack-bars and said pinion whereby to effect a cooperating engagement between said pinion and either of said rack-bars at will.

6. In a flying machine of the motor-propelled aeroplane type, a motor housing tiltable about a transverse axis of the machine, a plane tiltable with said motor housing, a propeller rotatable on said motor housing and about a longitudinal axis thereof, a pair of opposed rack-bars in spaced parallel longitudinal relation to each other, a pinion located normally in neutral relation between said rack-bars, said pinion being driven by the propelling motor of the machine and being operably connected with said motor housing whereby to effect the tilting of said motor housing when said pinion is engaged with either of said rack-bars, and means for effecting a relative lateral movement between said pinion and said rack-bars whereby said pinion is cooperatively engaged with either of said rack-bars at will.

DEMETRE DONCHEFF.